United States Patent
Pedersen et al.

(10) Patent No.: US 10,184,262 B2
(45) Date of Patent: Jan. 22, 2019

(54) ALIGNMENT TOOL, SYSTEM AND METHOD FOR THE CONNECTION OF WIND TURBINE TOWER SEGMENTS

(71) Applicant: Vestas Wind Systems A/S, Aarhus N. (DK)

(72) Inventors: Gunnar K. Storgaard Pedersen, Skjern (DK); Jens Torborg, Årre (DK); Ben Møller Nielsen, Lystrup (DK); Jesper Hermann Hansen, Varde (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/304,712

(22) PCT Filed: Apr. 16, 2015

(86) PCT No.: PCT/DK2015/050096
§ 371 (c)(1),
(2) Date: Oct. 17, 2016

(87) PCT Pub. No.: WO2015/161855
PCT Pub. Date: Oct. 29, 2015

(65) Prior Publication Data
US 2017/0037651 A1    Feb. 9, 2017

(30) Foreign Application Priority Data
Apr. 22, 2014    (DK) .................................. 2014 70229

(51) Int. Cl.
*E04B 1/61*    (2006.01)
*E04H 12/34*    (2006.01)
(Continued)

(52) U.S. Cl.
CPC ............. *E04H 12/34* (2013.01); *E04F 21/00* (2013.01); *E04H 12/085* (2013.01);
(Continued)

(58) Field of Classification Search
CPC ..... E04H 12/34; E04H 12/085; E04H 12/342; F03D 13/10; F03D 13/20; E04F 21/185;
(Continued)

(56) References Cited

U.S. PATENT DOCUMENTS 3,015,883 A * 1/1962 Brown ...................... F16L 1/10
29/271
5,228,181 A * 7/1993 Ingle ....................... B25B 27/16
228/44.5
(Continued)

FOREIGN PATENT DOCUMENTS

CN    102127987 A    7/2011
CN    102537518 A    7/2012
(Continued)

OTHER PUBLICATIONS

Danish Patent Office, Search Report in PA 2014 70229, dated Sep. 29, 2014.
European Patent Office, International Search Report and Written Opinion in PCT Application No. PCT/DK2015/050096, dated Jun. 22, 2015.

*Primary Examiner* — Brian D Mattei
(74) *Attorney, Agent, or Firm* — Wood Herron & Evans LLP

(57) ABSTRACT

An alignment tool for the alignment of a pair of vertical flanges for the connection of the longitudinal edges of adjacent segments of a cylindrical section of a wind turbine tower, comprises mounting means for connecting the alignment tool to a portion of a vertical flange of a tower segment; and a longitudinal alignment head for aligning the vertical flange with an opposing vertical flange of an adjacent tower segment. The alignment head comprises a front portion extending in a forwards direction from the mounting means, the front portion comprising a lower guiding surface adapted to abut with a top guiding edge of the opposing vertical flange or a bracket or tool mounted thereon and to guide the alignment head over the top edge of the opposing flange,
(Continued)

bracket or tool as the vertical flanges are brought towards each other during connection of the adjacent tower segments.

17 Claims, 8 Drawing Sheets

(51) Int. Cl.
    *E04H 12/08*     (2006.01)
    *F03D 13/10*     (2016.01)
    *F03D 13/20*     (2016.01)
    *E04F 21/00*     (2006.01)

(52) U.S. Cl.
    CPC ........... *E04H 12/342* (2013.01); *F03D 13/10* (2016.05); *F03D 13/20* (2016.05); *F05B 2230/604* (2013.01); *Y02E 10/72* (2013.01); *Y02P 70/523* (2015.11)

(58) Field of Classification Search
    CPC ............ E04F 21/1877; F05B 2230/604; B25B 27/16; F16L 23/003; Y10T 29/53917
    See application file for complete search history.

(56) References Cited

U.S. PATENT DOCUMENTS

| | | | |
|---|---|---|---|
| 5,560,091 A * | 10/1996 | Labit, Jr. | ................. B25B 27/16 |
| | | | 269/43 |
| 6,327,763 B2 * | 12/2001 | Stephen | .................... F16L 1/10 |
| | | | 269/43 |
| 6,568,712 B1 | 5/2003 | Aaron, III | |
| 9,518,563 B2 * | 12/2016 | Ollgaard | ............... E04H 12/085 |
| 2013/0236316 A1 | 9/2013 | Bitsch et al. | |
| 2014/0237932 A1 | 8/2014 | Moestrup et al. | |
| 2015/0147152 A1 * | 5/2015 | Van Heerden | ........... F16L 1/20 |
| | | | 414/800 |

FOREIGN PATENT DOCUMENTS

| | | |
|---|---|---|
| CN | 103603772 A | 2/2014 |
| EP | 1227204 A1 | 7/2002 |
| EP | 2754783 A1 | 7/2014 |
| WO | 2004083633 A1 | 9/2004 |
| WO | 2014075686 A1 | 5/2014 |

* cited by examiner

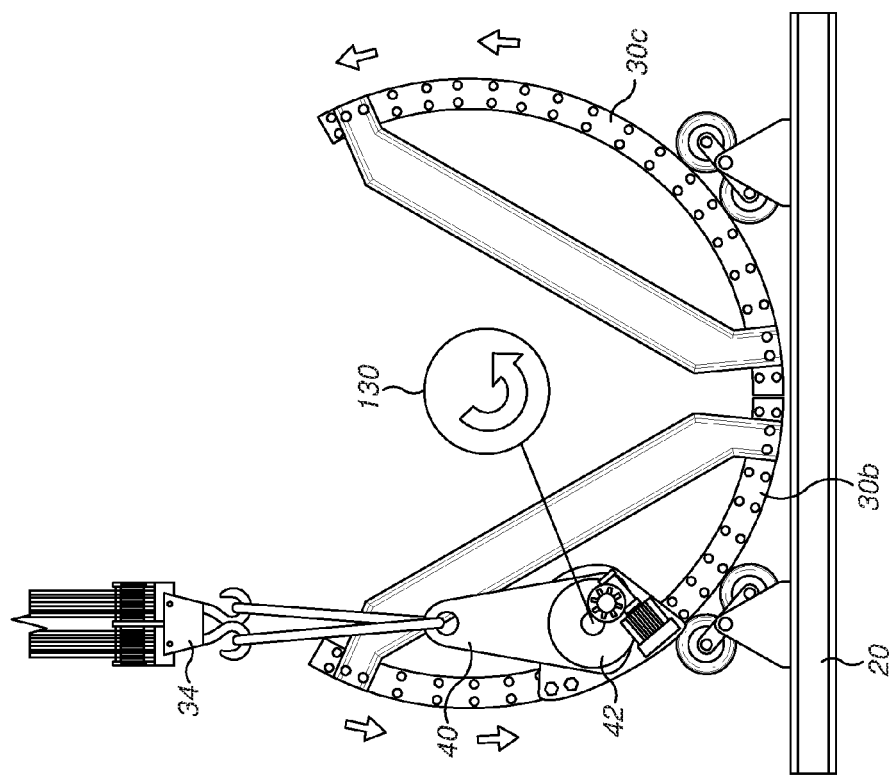
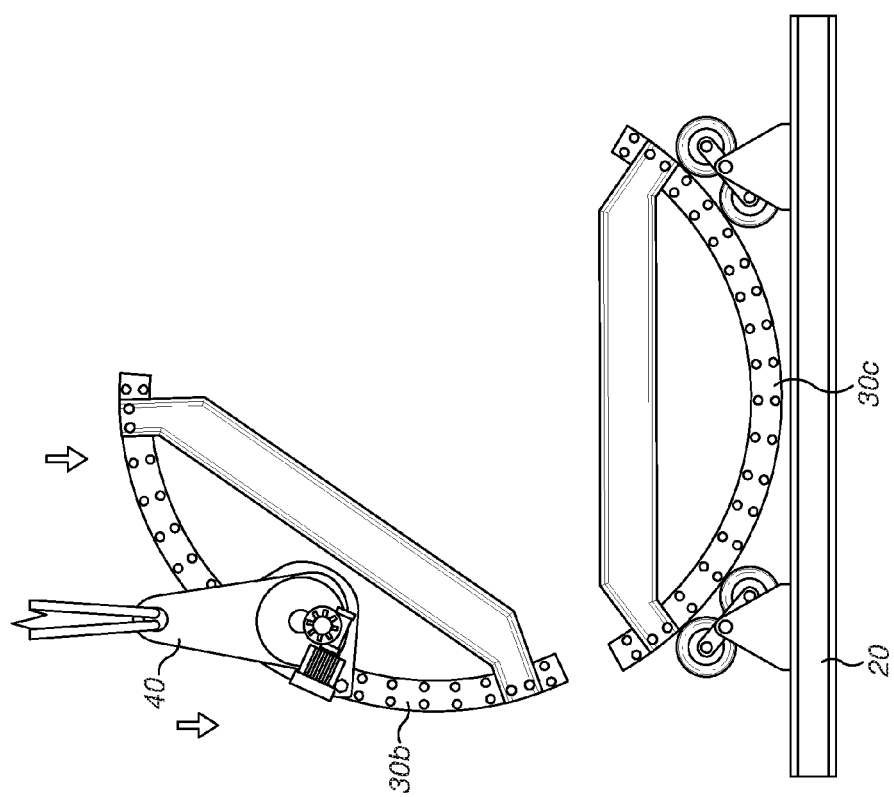
FIG. 3B
FIG. 3A

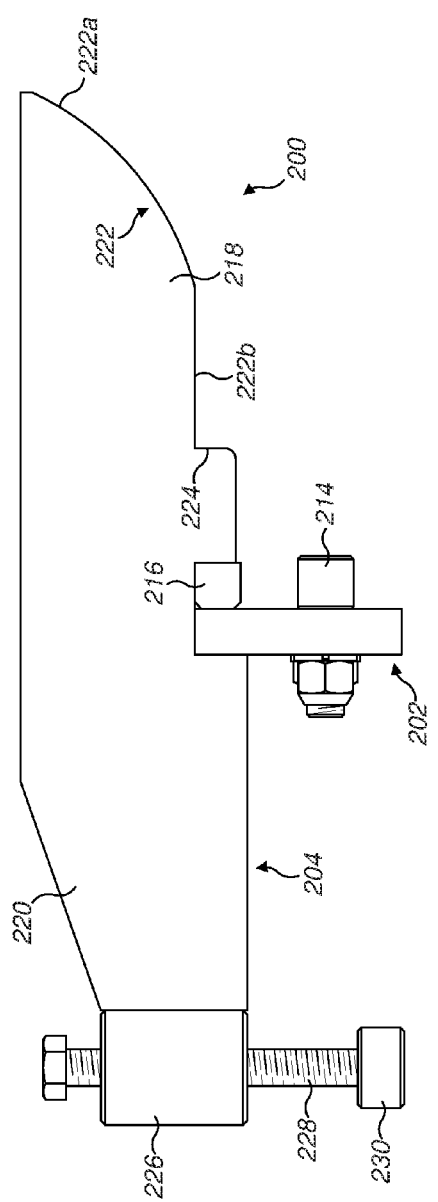
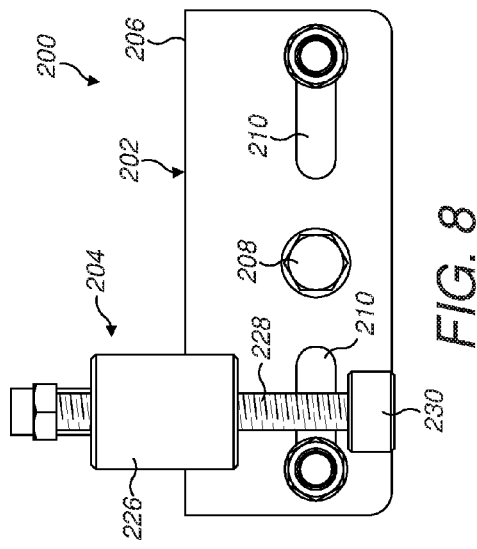

ALIGNMENT TOOL, SYSTEM AND METHOD FOR THE CONNECTION OF WIND TURBINE TOWER SEGMENTS

The present invention relates to an alignment system and an alignment tool for use in the connection of wind turbine tower segments during the construction of a wind turbine tower and to a method for the alignment of adjacent segments of a wind turbine tower.

The increasing demand for wind energy may be met both by building more wind parks and by building wind parks capable of generating more energy per turbine. Generating more energy per turbine requires wind turbines with larger generators, which in turn need larger blades to capture more energy from the incident wind. Such turbines also require wider and taller towers to support the blades, nacelle and other components. The increasing physical dimensions of modern wind turbine towers lead to difficulties in transporting the tower from the manufacturing site to the installation site where the wind turbine is to be constructed. This is particularly true if the wind turbine tower or components of the wind turbine tower are to be transported by road, for example on the trailer of a truck, causing potential disruption to other road users.

Wind turbine towers may therefore be transported as a series of prefabricated parts which are assembled into the tower at the installation site. Although the use of prefabricated tower parts makes transport easier, additional overhead is placed on the pre-transport and assembly processes as a result of the larger number of component parts that need to moved and handled. Such a tower is described in WO 2004/083633, filed on 19 Mar. 2003, which is hereby incorporated by reference. Further, due to variations in individual manufacturing processes prefabricated sections may not always fit together as readily as would be desired, resulting in more intensive labour at the construction site. In addition, the prefabricated parts may need to be assembled into towers that taper from a wider base to a smaller diameter towards the top. This means that the prefabricated parts may be of different physical dimensions to one another and thus require more complex handling and transport.

Wind turbine towers may be constructed from a plurality of steel shells joined together by means of bolted or welded joints. The plurality of steel shells are circular in cross section and may have diameters that are greater for the shells used at the base section of the tower and smaller for sections used at the top. This gives the tower a tapered shape with a wider base, providing a structure strong enough to support the nacelle and the components housed within it, and to resist the lateral forces from the wind and rotor blades. The steel shells are often manufactured at a tower production site and joined, such as by welding, together into cylindrical sections of the tower for transport to a construction or installation site. The shells can also be frusto-conical in shape.

A cylindrical section of the tower may therefore be made up of a plurality of steel shells. The cylindrical sections of the tower may be cut into segments for ease of transport as described in WO 2004/083633 A1, filed on 19 Mar. 2003, which is hereby incorporated by reference. Transport may potentially be over both land and sea.

The segments are secured to one another to form a tower section by means of vertical flanges located along the interior of the segments at their vertical edges. The flanges of adjacent segments can be joined using bolts inserted through bolt holes in the flanges. Flanges are also attached to the periphery of the open ends of the cylindrical section so the tower sections, once mounted on top of each other, can be joined together. Similarly, the flanges of adjacent segments and sections are joined using bolts inserted through bolt holes in the flanges.

Once the cylindrical tower sections are assembled into a tower, the flanges attached to the open ends of the cylindrical sections will be orientated horizontally, and will be joined to corresponding flanges on the neighbouring sections. In use, the interior longitudinal flanges will be orientated vertically. The terms "horizontal flange" and "vertical flange" will therefore be used herein to distinguish the two types of flanges from one another.

The process of first forming a complete tower section and subsequently cutting the cylindrical section into tower segments assists the tower segments in fitting together properly when they are reassembled at the installation site. This technique is therefore in contrast to methods where individual segments are separately manufactured and then assembled into a cylindrical section for the first time at the installation site. When the tower segments are reassembled into the cylindrical sections, the longitudinal edges of the tower segments are joined along the vertical flanges provided on the interior of the tower section. Alternatively, the tower segments can be manufactured as single parts without cutting them out from a complete tower section.

The use of the word "vertical" with regard to the flanges is to indicate their orientation once installed in the tower, and is not therefore intended to be used in a limiting way with regard to the method of production or assembly. As will be explained below, the handling and reassembly processes may be more conveniently carried out while the flanges are laid horizontally.

Each of the vertical flanges provided on the interior of the tower segments will typically be provided with a plurality of spaced apart holes along the length of the flange, for receiving bolt fasteners to connect the vertical flange to the corresponding flange of the adjacent segment. During the reassembly method, the adjacent tower segments must be brought together so that the vertical flanges are aligned with each other, with the plurality of holes substantially aligned opposite each other so that a plurality of bolts may be passed through the holes of the flanges to connect them to each other.

The vertical flanges will typically be welded onto the inside of the tower segments and may be formed of several connected sections. The vertical flanges may not, therefore, be completely straight along the entire length, which may make the alignment of the flanges more difficult. There will also typically be at least a small degree of deformation of the vertical flanges and the tower segments due to the large size and weight of the components. Furthermore, the large size of the tower segments may make it difficult to bring the adjacent tower segments together with enough accuracy that the flanges are sufficiently aligned. If the vertical flanges are misaligned, the corresponding connection holes in the flanges will not be at the same level as each other and the mounting of the connection bolts in the holes will therefore not be possible.

It would therefore be desirable to provide a system and method for facilitating the alignment of the vertical flanges during reassembly of the tower segments so that the connection of adjacent flanges can be carried out more accurately and more efficiently. It would further be desirable if such a system and method could be provided that ensures minimal damage to the vertical flanges of the tower segments or the tower segments themselves.

SUMMARY OF THE INVENTION

According to a first aspect of the invention there is provided a wind turbine tower segment for forming a cylindrical section of a wind turbine tower, the cylindrical section constructed from a plurality of tower segments connected along their respective longitudinal edges, wherein the tower segment comprises a first vertical flange on the interior thereof, proximate a longitudinal edge and further comprises an alignment tool mounted on the first vertical flange for the alignment of the first vertical flange of the tower segment with a second vertical flange of an adjacent tower segment during the connection of the adjacent tower segments to form the cylindrical section.

The alignment tool of the tower segment of the invention comprises: mounting means connecting the alignment tool to a portion of the first vertical flange of the tower segment; and a longitudinal alignment head comprising a front portion extending in a forwards direction from the mounting means over the longitudinal edge of the tower segment. The front portion comprises a lower guiding surface adapted to abut with a top guiding edge of the second vertical flange of the adjacent tower segment and to guide the alignment head over the top guiding edge of the second vertical flange as the first and second vertical flanges are brought towards each other during connection of the adjacent tower segments.

The tower segment according to the invention preferably comprises a main body portion, which will typically be formed of a steel sheet having a curved profile. The tower segment comprises two opposed longitudinal edges, which will be substantially straight and vertical in the assembled tower section. A vertical flange is provided at a distance from a first longitudinal edge and this flange will be connected to a corresponding vertical flange on the adjacent tower segment. The flange is preferably formed of steel and is preferably welded to the inner surface of the tower segment. The flange may be formed of a single part, or a plurality of connected parts. An alignment tool as described in more detail below is mounted on the vertical flange. The tower segment will typically further comprise a second vertical flange proximate the opposite longitudinal edge and this second vertical flange may additionally include an alignment tool mounted thereon for the alignment of the tower segment with an adjacent tower segment on the opposite side.

The tower segment according to the invention will be connected along each of its longitudinal edges to corresponding tower segments to make up a cylindrical tower section, as described above. The tower sections will then be assembled vertically by connecting them along their horizontal edges to form a wind turbine tower.

According to a second aspect of the invention there is provided an alignment system for aligning a pair of vertical flanges for the connection of the longitudinal edges of adjacent tower segments of a cylindrical section of a wind turbine tower, wherein a vertical flange is provided on the interior of each tower segment, proximate the respective longitudinal edge. The alignment system comprises: an alignment tool for mounting on a first vertical flange of a first tower segment and a guiding bracket for mounting on a second vertical flange of a second tower segment substantially opposite the alignment tool, wherein the second bracket comprises a top guiding edge adapted to sit above the top edge of the second vertical flange during use.

The alignment tool of the alignment system according to the second aspect of the invention comprises: mounting means for connecting the alignment tool to a portion of the first vertical flange of the first tower segment; and a longitudinal alignment head comprising a front portion extending in a forwards direction from the mounting means. The front portion comprises a lower guiding surface adapted to abut with the top guiding edge of the guiding bracket mounted on the second vertical flange and to guide the alignment head over the top guiding edge of the guiding bracket as the first and second vertical flanges are brought towards each other during connection of the first and second tower segments.

According to a third aspect of the invention there is provided an alignment system for aligning a pair of vertical flanges for the connection of the longitudinal edges of adjacent tower segments of a cylindrical section of a wind turbine tower, wherein a vertical flange is provided on the interior of each tower segment, proximate the respective longitudinal edge, the alignment system comprising a first alignment tool for mounting on a first vertical flange of a first tower segment and a second alignment tool for mounting on a second vertical flange of a second tower segment substantially opposite the first alignment tool.

Each of the first and second alignment tools of the alignment system according to the third aspect of the invention comprises: mounting means for connecting the alignment tool to a portion of the vertical flange of the respective tower segment; a top guiding edge adapted to sit above the top edge of the corresponding vertical flange during use; and a longitudinal alignment head comprising a front portion extending in a forwards direction from the mounting means towards the opposite alignment tool. The front portion comprises a lower guiding surface adapted to abut with the top guiding edge of the opposite alignment tool and to guide the alignment head over the top guiding edge of the opposite alignment tool as the alignment tools are brought towards each other during connection of the first and second tower segments.

According to a fourth aspect of the invention there is provided an alignment tool for use in aligning a pair of vertical flanges for the connection of the longitudinal edges of adjacent tower segments of a cylindrical section of a wind turbine tower, wherein a vertical flange is provided on the interior of each tower segment, proximate the respective longitudinal edge. The alignment tool comprises: mounting means for connecting the alignment tool to a portion of a vertical flange of a tower segment; and a longitudinal alignment head for aligning the vertical flange with an opposing vertical flange of an adjacent tower segment, the alignment head comprising a front portion extending in a forwards direction from the mounting means. The front portion comprises a lower guiding surface adapted to abut with a top guiding edge of the opposing vertical flange or a bracket mounted thereon and to guide the alignment head over the top edge of the opposing flange or bracket as the vertical flanges are brought towards each other during connection of the adjacent tower segments.

According to the invention there is further provided the use of an alignment system or alignment tool according to the invention, as defined above, during the construction of a wind turbine tower formed from a plurality of connected tower segments.

In the following description, any discussion of the alignment tool or tools of the alignment systems of the present invention should also be considered as being applicable to the alignment tool of the present invention and the alignment tool of the tower segment of the present invention, and vice versa.

As described in more detail below, the alignment system or tool according to the present invention can advantageously be mounted on the existing vertical flanges of the tower segments, without the need for any modification of the flanges or the tower segments. The mounting of the alignment tools can be carried out simply and conveniently prior to the reassembly process and the alignment tools can be readily removed from the tower segments once the connection of the pair of vertical flanges is complete.

The alignment tools and systems of the present invention use the alignment head of the alignment tool (or tools) to guide the vertical flanges towards each other and to align the level of the vertical flanges as they are brought together so that the holes in the flanges are brought to the same level as each other for insertion of the connection bolts. The lower guiding surface of the alignment head of the tool is adapted to abut with a top guiding edge provided on the opposite vertical flange and to slide over the top guiding edge, thereby guiding the alignment head over the top guiding edge. In this way, the alignment system guides the flanges towards each other at the same level. According to the first aspect of the invention, the alignment head is adapted to engage with the top edge of the opposite vertical flange. In the alignment systems of the second and third aspects of the invention, the alignment head is instead adapted to engage with a top guiding edge provided on a complementary guiding bracket or alignment tool, respectively, rather than the top edge of the flange itself. Any direct contact between the alignment head and the vertical flanges is therefore avoided, thus avoiding potentially damage to the vertical flanges during the reassembly process.

Once the vertical flanges are brought together to the desired separation, the alignment tool or tools act to stabilise the flanges at the same level whilst the connection of the flanges is carried out.

The alignment systems according to the second and third aspects of the present invention comprise a pair of complementary components which act together to bring about the alignment of the pair of vertical flanges. As described above, the pair of components may include a single alignment tool and a guiding bracket, or a pair of alignment tools. In either case, the components are preferably mounted on the vertical flanges to be connected at corresponding vertical levels such that the components are opposite to each other and can engage with each other as the longitudinal edges of the tower segments are brought together. Preferably, alignment systems according to the invention comprise a plurality of pairs of components, spaced apart along the length of the tower segments such that the alignment of the vertical flanges can be effected along the full length. Each tower segment will therefore incorporate a plurality of alignment tools or guiding brackets mounted at spaced apart intervals along the respective vertical flange.

In certain embodiments of the invention, one or more alignment tools may be provided on both of the vertical flanges but with the alignment tools offset from each other in the longitudinal direction so that the alignment tools are not provided opposite to each other in pairs. In this case, each alignment tool may engage with the top edge of the opposite vertical flange, as in the first aspect of the invention, or with the top guiding edge of an opposed guiding bracket, as in the second aspect of the invention.

The constituent parts of the alignment tools will now be described in more detail. The following description applies to the alignment tools of all aspects of the invention. It should be assumed that in the alignment systems of the third aspect of the present invention comprising a pair of alignment tools, the first and second alignment tools of each pair are of a corresponding size and construction to each other.

As described above, each alignment tool is formed of mounting means for connecting the tool to the vertical flange and an alignment head for bringing about the alignment of the vertical flanges of adjacent tower segments.

The mounting means of the alignment tool of the present invention is adapted for fixture to the interior vertical flange of a tower segment and is preferably adapted to be connected to the existing holes provided in the flange using one or more conventional fasteners. No modification to the construction of the vertical flange or the tower segment is therefore required in order to implement the alignment system.

The mounting means may take any suitable form which enables the alignment tool to be effectively mounted on the vertical flange. Preferably the mounting means comprises an attachment bracket adapted to receive one or more fasteners for the connection of the attachment bracket against the corresponding vertical flange. The alignment head is preferably mounted on the attachment bracket. Where the alignment system comprises a pair of alignment tools, as in the third aspect of the invention, the attachment bracket preferably provides at least a part of the top guiding edge with which the alignment head of the opposite tool engages during use.

The attachment bracket may be attached directly to the flange, or in some cases an intermediate plate or layer may be inserted between the attachment bracket and the flange.

Preferably, the attachment bracket comprises one or more holes for aligning with the holes on the corresponding vertical flange to enable suitable fasteners to be fitted. Preferably, the attachment bracket is connected to a plurality of the holes of the vertical flange using a plurality of fasteners. For example, in the specific embodiment described below, the attachment bracket comprises three holes for connecting the bracket to three corresponding holes in the vertical flange. Where a plurality of connection holes is provided in the attachment bracket, the holes may be adapted to receive a variety of suitable fasteners, as would be known to the skilled person. For example, one or more holes on the attachment bracket may be adapted to receive a conventional bolt fastener, such as those used to connect the opposed vertical flanges. Alternatively or in addition, one or more holes on the attachment bracket may be adapted to receive a non-threaded pin or bolt. In certain preferred embodiments, a combination of bolt fasteners and non-threaded pins is used in order to facilitate the removal of the alignment tools after the connection of the vertical flanges.

Preferably, the attachment bracket comprises one or more elongate slotted holes to receive one or more fasteners for the connection of the bracket against the vertical flange, each elongate slotted hole extending in the longitudinal direction of the flange. The use of slotted holes enables the alignment tool to be adapted to fit to vertical flanges having different hole spacings and may facilitate the mounting of the tool for tower segments of different sizes. Preferably, at least one circular hole is provided in combination with the elongate slotted holes, for example in the centre of the attachment bracket, in order to secure the longitudinal position of the attachment bracket along the vertical flange.

Where the attachment bracket provides a top guiding edge for engaging with the alignment head of an opposite alignment tool, as described above, the size and shape of the attachment bracket and the position of the holes for receiving the one or more fasteners for connection to the vertical flange may be adapted such that when the alignment tool is in place on the vertical flange, the top guiding edge of the attachment bracket is positioned above the level of the top edge of the vertical flange. This is to ensure that the lower guiding surface of the alignment head of the opposite alignment tool is able to slide over the top guiding edge of the opposite attachment bracket and not come into contact with the vertical flange. As discussed above, this is to avoid any damage to the vertical flanges of the tower segments. Preferably, the top guiding edge of the attachment bracket is substantially straight.

The attachment bracket may take any suitable form. In certain preferred embodiments of the invention, the attachment bracket comprises an attachment plate, on which the alignment head is mounted. The attachment plate is typically flat and longitudinal in shape and in use is connected against a portion of the vertical flange, with the longitudinal axis of the attachment plate substantially aligned with the longitudinal axis of the vertical flange. Where required, the top edge of the attachment plate provides the top guiding edge.

In certain embodiments, the attachment bracket may be provided with a lip or flange at the top end, which is adapted to overlie the top edge of the vertical flange of the tower segment when the alignment tool is in position, thereby further increasing the level of protection of the vertical flange in the region of the alignment tool. The lower surface of the additional lip or flange is preferably substantially flush with the top edge of the vertical flange, so that the alignment tool can be additionally supported on the additional flange or lip. The lip or flange may be an integral part of the attachment bracket or may be fitted as a separate part at the top edge of the attachment bracket. The top edge of the lip or flange is preferably substantially flush with the top edge of the attachment bracket and the top edge therefore preferably forms a part of the top guiding edge, where required, in combination with the top edge of the attachment bracket.

The longitudinal alignment head of the alignment tool of the present invention is connected to or integrated with the mounting means such that the connection of the mounting means to the vertical flange also fixes the position of the alignment head relative to the flange. Where the mounting means comprises an attachment bracket as described above, the alignment head is preferably mounted at the top edge of the attachment bracket. The alignment head may be fixedly mounted to the attachment bracket, for example by welding, such that there is substantially no relative movement of the alignment head and the attachment bracket. Alternatively, the alignment head may be pivotally mounted at the top edge of the attachment bracket to enable a certain degree of pivotal movement of the alignment head relative to the attachment bracket, about the top edge of the alignment head.

The alignment head may be mounted directly or indirectly on the attachment bracket or alternative mounting means using any suitable means, as would be known to the skilled person. The skilled person will appreciate that the way in which the alignment head is mounted will depend to some extent on the shape and form of the alignment head and the mounting means. In the specific embodiment described below, the alignment head comprises a cut out at a position along the bottom edge, which is seated over the top edge of the attachment bracket. The alignment head is then held in place using suitable means such as welding or bolting.

Preferably, where the mounting means comprises an attachment bracket as described above, the alignment head is mounted adjacent a first end of the top edge of the attachment bracket. For embodiments including a pair of alignment tools, this positioning of the alignment head at one end of the attachment bracket provides sufficient space along the remainder of the top edge for the sliding engagement with the alignment head of the opposite alignment tool. Typically, the alignment tools will be mounted opposite to each other such that the alignment head of each tool slides over the top edge of the attachment bracket of the opposite alignment tool at the opposite end of the top edge to the end at which the alignment head is mounted. This arrangement ensures that the alignment heads are able to slide freely over the opposite alignment tools without the risk of interference or collision of the tools with each other.

Preferably, the longitudinal alignment head is mounted such that the longitudinal axis of the alignment head is substantially perpendicular to the longitudinal axis of the vertical flange. The perpendicular arrangement of the alignment head enables the alignment head to remain in substantially the same longitudinal position relative to the opposite vertical flange as the alignment head is guided over the top edge of the opposite flange, bracket or tool.

The alignment head comprises a front portion extending in a forwards direction from the mounting means. The front portion therefore extends from the mounting means over the longitudinal edge of the tower segment towards the opposite vertical flange.

The front portion of the alignment head provides a lower guiding surface which is adapted to slide over the top edge of the opposite flange or a bracket or tool mounted thereof, as the vertical flanges are brought together, thereby guiding the alignment head over the top edge. The lower guiding surface is therefore preferably relatively smooth and preferably has a substantially continuous shape. The lower guiding surface may be substantially straight or may be curved, or may include straight portions and curved portions.

Preferably, the lower guiding surface curves or slopes in a downwards direction moving along the front portion from the distal end thereof along at least a part of the length of the front portion towards the attachment bracket. The vertical distance between the top edge of the front portion and the lower guiding surface therefore increases with increasing distance from the distal end of the front portion, along at least the section of the front portion proximate the distal end.

The "distal end" refers to the free end of the front portion furthest from the mounting means. The distal end will typically be the first part of the front portion to come into contact with the opposite flange, bracket or tool during the alignment process. The downwards sloping of the lower guiding surface from the distal end facilitates the initial abutment of the alignment head and the opposite top guiding edge and helps to reduce the impact of the abutment of the alignment tool on the vertical flanges. The sloping shape proximate the distal end also ensures that the initial sliding of the alignment head over the opposite guiding edge is as smooth as possible and that unnecessary loading of the alignment tool(s) and the vertical flanges is avoided.

The lower guiding surface may slope downwards from the distal end in a substantially straight line, or in a curved manner. Preferably, the lower guiding surface of the alignment head comprises a convexly curved portion proximate the distal end of the alignment head. Particularly preferably, the convexly curved portion of the lower guiding surface extends to the top edge of the front portion at the distal end of the alignment head to provide the front portion with a curved distal end. This further reduces the impact of the initial abutment of the alignment head with the opposite guiding edge compared with a front portion having a blunter shape.

Preferably, the lower guiding surface of the front portion of the alignment head comprises a substantially flat, horizontal portion extending continuously from the sloping portion towards the attachment bracket. After the initial sliding of the alignment head over the top guiding edge of the opposite alignment tool, the horizontal portion of the lower guiding surface enables the relative levels of the opposite flanges to be fixed and maintained such that the levels remain the same with any further movement of the flanges towards each other.

Preferably, the lower guiding surface comprises an abutment between the distal end of the front portion of the alignment head and the mounting means, for limiting the sliding movement of the alignment head over the opposite guiding edge. The abutment will typically take the form of a shoulder or step in the lower guiding surface that projects in a downwards direction from the surface. As the vertical flanges are brought together, the alignment head will slide over the opposite guiding edge until the abutment in the lower guiding surface abuts with the opposite guiding edge. At this point, further movement of the vertical flanges towards each other will be substantially prevented. The position of the abutment in the lower guiding surface may be adapted depending on the desired separation of the vertical flanges for bolting.

In certain embodiments, an abutment in the lower guiding surface may be unnecessary or may be provided as a precautionary measure rather than to define the separation distance of the vertical flanges, for example, where it is intended to bring the vertical flanges together and into contact with each other for bolting, with no separation between them.

Preferably, the alignment head further comprises a rear portion extending backwards from the mounting means, (i.e. back towards the main body of the tower segment), and adapted to engage with the inner surface of the respective tower segment during use. The rear portion may itself be adapted for direct contact with the inner surface of the tower segment. Alternatively, the rear portion may be adapted to receive an additional component for engagement with the inner surface. For example, the rear portion of the alignment head is preferably adapted to receive a screw member or hydraulic member having a distal end adapted to engage with the inner surface of the respective tower segment during use.

The rear portion therefore preferably includes one or more holes, annular channels, rings or other suitable means to receive a screw member or hydraulic member which passes through the rear portion and into contact with the inner surface of the tower segment. The screw member or hydraulic member passing through the rear portion of the alignment head works together with the mounting means to secure the position of the alignment tool relative to the corresponding vertical flange. The screw member or hydraulic member in the rear portion of the alignment head may also act to brace the alignment head against the inner surface of the tower segment. This minimises as far as possible any torque on the vertical flange from the alignment tool, thereby reducing the risks of damage to the vertical flanges during use of the alignment system.

Preferably, the rear portion of the alignment head is adapted to receive an adjustable screw member or hydraulic member which can be adjusted to bring the distal end thereof into contact with the inner surface of the tower segment. This enables the alignment tool to be adjusted to engage with tower segments of different sizes and circumferences. In certain embodiments, the adjustable screw member or hydraulic member may also be adapted for adjusting the height and angle of the alignment head relative to the vertical flange when the alignment tool is installed on the vertical flange. This enables the alignment tool to be adjusted to the appropriate height and angle depending on, for example, the dimensions of the vertical flange and/or the diameter of the corresponding tower section.

When the screw member or hydraulic member is in place through the rear portion of the alignment head, the distal end of the screw member or hydraulic member preferably contacts the inner surface of the tower segment to provide the engagement of the rear portion of the alignment head with the inner surface. The distal end of the screw member or hydraulic member may directly contact the inner surface of the tower segment. However, more preferably, resilient means are provided between the distal end of the screw member or hydraulic member and the inner surface of the tower segment in order to minimise damage to the inner surface. For example, in certain preferred embodiments the screw member or hydraulic member comprises a resilient cap, such as a rubber cap, at the distal end thereof.

The alignment tool may further comprise a screw member or hydraulic member mounted in the rear portion of the alignment head. In such embodiments, the screw member or hydraulic member for providing engagement between the alignment head and the inner surface of the tower segment is integrated into the alignment tool.

The front portion and the rear portion of the alignment head are preferably integrally formed with each other in a single part, but may alternatively be formed of two separate parts which are connected to each other directly, or through the mounting means.

In certain embodiments of the invention comprising a pair of alignment tools, means may be provided to clamp the first and second alignment tools of the alignment system together during use. In this way, the first and second alignment tools could be used not only to align the level of the vertical flanges but additionally to provide a clamping arrangement to adjust and maintain the distance between the vertical flanges. For example, the first and second alignment tools may be adapted to be connected together such that the attachment brackets of the tools form the opposed jaws of a vice arrangement, wherein the vice arrangement may be used to draw the attachment bracket towards each other.

The alignment tools of the present invention may be formed from a variety of suitable materials, which would be known to the skilled person. A suitable material should provide the requisite rigidity and strength to enable the alignment tool to function as described. An example of a suitable and preferred material is steel.

In the alignment systems according to the second aspect of the present invention, a first alignment tool is used in conjunction with a guiding bracket on the opposite flange. Where a guiding bracket is used on the opposite flange, the guide bracket may take a similar form to that described above with reference to the attachment bracket for the alignment tool. The guiding bracket is preferably adapted to be connected to the vertical flange as described above for the attachment bracket, i.e. by means of suitable holes for receiving fasteners to connect the guiding bracket to the existing holes on the vertical flange. In certain preferred embodiments, the guiding bracket comprises a guiding plate with an arrangement of holes for receiving one or more fasteners. The guiding bracket is adapted such that once fixed in place on the vertical flange, the top edge of the guiding bracket sits above the top edge of the vertical flange to provide a top guiding edge with which the alignment head of the first alignment tool engages during use. The top guiding edge is preferably substantially straight.

The guiding bracket should be mounted at substantially the same vertical level as the first alignment tool so that the alignment head of the tool abuts with the top guiding edge of the bracket as the vertical flanges are brought together. Several alignment tools may be used along the length of a tower segment, with a corresponding number of guiding brackets provided on the opposite vertical flange. The spacing of the alignment tools and brackets may be altered as required.

Similarly, where the alignment system of the invention includes first and second alignment tools, the alignment tools should be mounted at substantially the same vertical level as each other so that the alignment head of each tool is mounted opposite the top guiding edge of the opposite tool. The alignment tools may be mounted on the vertical flanges independently from each other, provided the corresponding pairs of tools are mounted at the same vertical level as each other. Several pairs of alignment tools may be used along the length of each segment and the spacing of the pairs of tools may be altered as required.

According to the invention there are provided methods for the alignment of the vertical flanges of adjacent segments of a cylindrical section of a wind turbine tower during the connection of the longitudinal edges of the adjacent segments, each segment comprising a vertical flange on the interior of the segment, proximate the respective longitudinal edge.

A first method according to the invention comprises the steps of:

installing an alignment system according to the second aspect of the invention, as defined above, into the adjacent tower segments by mounting an alignment tool on the vertical flange of the first tower segment and mounting a guiding bracket on the vertical flange of the second tower segment at a corresponding vertical position to the first alignment tool;

arranging the tower segments with the respective longitudinal edges adjacent to each other such that the alignment head of the alignment tool is abutting the top guiding edge of the opposite guiding bracket to align the levels of the vertical flanges; and adjusting the tower segments to bring the longitudinal edges towards each other such that the alignment head the alignment tool is guided over the top guiding edge of the opposite guiding bracket until the vertical flanges are a predetermined distance from each other.

A second method according to the invention comprises the steps of:

installing an alignment system according to the third aspect of the invention, as defined above, into the adjacent tower segments by mounting a first alignment tool on the vertical flange of the first tower segment and mounting a second alignment tool on the vertical flange of the second tower segment;

arranging the tower segments with the respective longitudinal edges adjacent to each; and adjusting the tower segments to bring the longitudinal edges towards each other such that the alignment head of each alignment tool is guided over the top guiding edge of the opposite alignment tool until the vertical flanges are a predetermined distance from each other.

Preferably, the first and second alignment tools are mounted at a corresponding longitudinal position to each other with the respective alignment heads offset from each other in the longitudinal direction such that the lower guiding surface of the alignment head of each alignment tool abuts the top guiding edge of the opposite alignment tool to align the levels of the vertical flanges.

A third method according to the invention comprises the steps of:

installing an alignment tool according to the invention, as defined above, on the vertical flange of the first tower segment;

arranging the tower segments with the respective longitudinal edges adjacent to each other such that the alignment head of the alignment tool is abutting the top edge of the opposite vertical flange of the adjacent tower segment to align the levels of the vertical flanges; and adjusting the tower segments to bring the longitudinal edges towards each other such that the alignment head of the alignment tool is guided over the top edge of the opposite vertical flange until the vertical flanges are a predetermined distance from each other.

During each alignment method, the (or each) alignment tool is first brought into initial contact with the opposite top guiding edge, which may be provided on the opposite alignment tool, guiding bracket, or flange, depending on the method. The tower segments are then adjusted more accurately to bring the longitudinal edges of the adjacent segments, and therefore the (or each) alignment tool and the corresponding guiding edge, towards each other. During this adjustment step, the alignment head of the (or each) alignment tool will slide over the top guiding edge of the opposite flange, tool or bracket and the alignment tool or tools will act to guide the flanges and to align the levels of the vertical flanges relative to each other. In this way, the holes of the vertical flanges will be aligned with each other in opposing pairs along the length of the vertical flanges. Once the flanges are brought together to the desired separation distance, bolt fasteners can then be passed through the respective pairs of holes to connect the vertical flanges in the conventional manner.

Preferably, the step of mounting the (or each) alignment tool on the respective vertical flange comprises: connecting the mounting means of the alignment tool to the vertical flange using one or more fasteners, wherein the mounting means are connected such that the front portion of the alignment head extends forwards towards the longitudinal edge of the tower segment. Where the alignment head includes a rear portion, as described above, the method further comprises inserting a screw member or hydraulic member through the rear portion of the alignment head of the alignment tool; and adjusting the screw member or hydraulic member in the rear portion of the alignment head to engage the distal end of the screw member or hydraulic member against the inner surface of the tower segment.

According to the present invention there is further provided a method for the connection of adjacent segments of a cylindrical section of a wind turbine tower, the method comprising: aligning the vertical flanges of the adjacent segments using one of the alignment method defined above; and inserting a plurality of bolt fasteners to connect the vertical flanges to each other along the length.

Preferably, methods according to the invention further comprise the step of removing the alignment tool or alignment system from the tower segments after the connection of the vertical flanges.

In certain embodiments, it may be desired to bring the vertical flanges towards each other such that they are spaced apart by a predetermined distance for the bolting process. In this case, it may be advantageous to incorporate a strip or bar between the flanges. In other embodiments, it may be desired to bring the vertical flanges into contact with each other so that the predetermined distance between them is effectively zero.

Preferably, the first and second tower segments are supported on a suitable supporting structure during the alignment process. For example, the tower segments may be supported on a roller bed, comprising a flat base to which pairs of rollers are mounted. The use of a roller bed allows the tower section to be conveniently rotated. However, other suitable supporting structures are available. With the use of a supporting structure, the alignment method of the present invention will typically be carried out with the vertical flanges lying in a substantially horizontal direction.

BRIEF DESCRIPTION OF THE DRAWINGS

The invention will now be further described by way of example only and with reference to the accompanying figures in which:

FIGS. 3A and 3B show the unloading of a second segment onto the roller and the adjustment of the adjacent segments;

FIG. 7 is a side view of the alignment tool of FIG. 6;

FIG. 8 is an back view of the alignment tool of FIGS. 5 and 6; and

DETAILED DESCRIPTION

Figure 1:
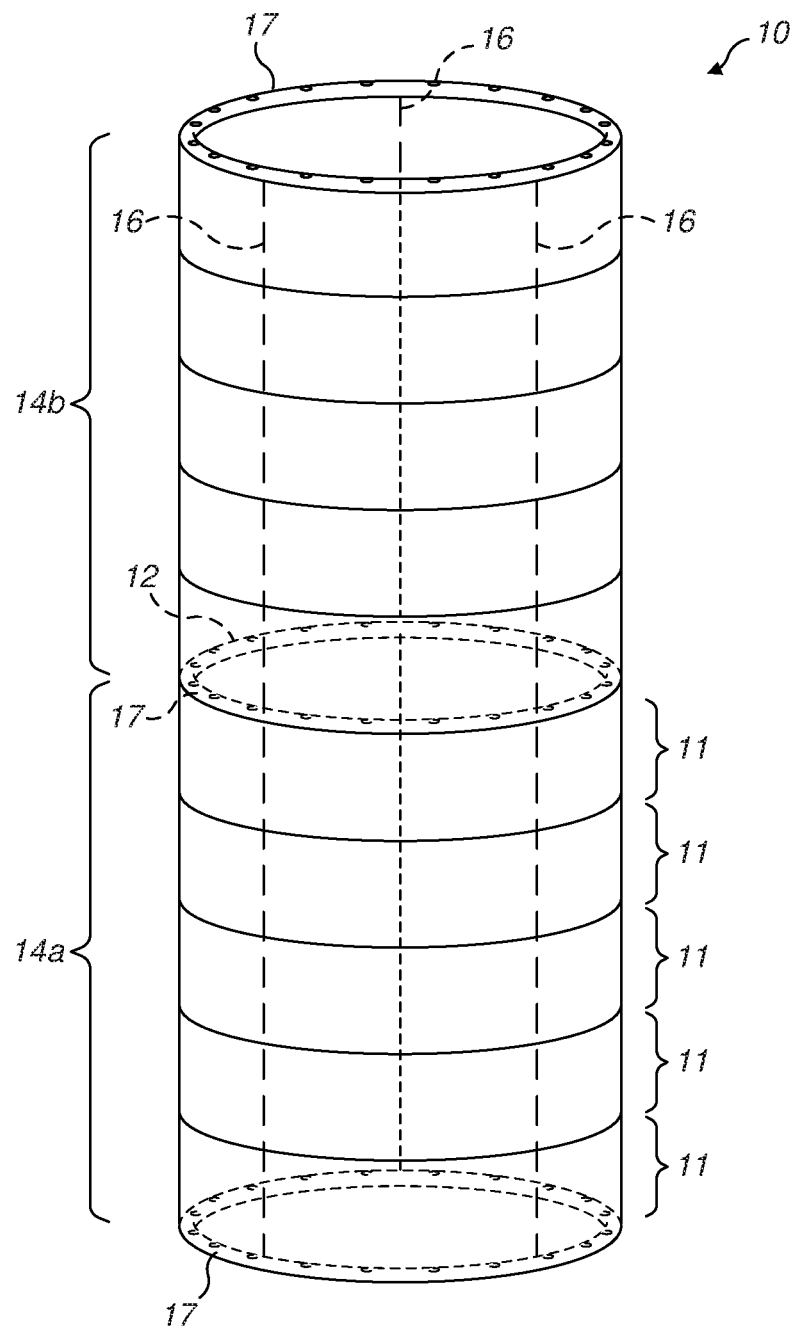
FIG. 1 is a schematic view of part of a wind turbine tower, showing lines along which the tower is cut into sections and segments.

FIG. 1 shows a partial span 10 of an assembled wind turbine tower, the tower being constructed from several shells 11 being welded or bolted together. For clarity only, the lower five shells 11 are labelled in FIG. 1, but it will be appreciated that the shell structure continues along the length of the tower span 10.

Span 10 is shown as comprising two cylindrical sections 14a and 14b joined together to one another at horizontal join 12. Horizontal flanges 17 are located at the horizontal joins 12, and at the top and bottom of the span 10, in order to allow adjacent sections to be connected together. A tower will often be made up of many cylindrical sections, depending on its height. In practice, the opposing horizontal flanges 17 located on the open ends of the respective cylindrical sections are brought together using lifting machinery, such as a tower crane, and the cylindrical sections are then secured to one another using bolts passing through bolt holes in the horizontal flanges 17.

As noted above, it is desirable to transport the cylindrical sections as respective segments which are then reassembled at the installation site. In the example shown in FIG. 1, each of the cylindrical sections 14a and 14b are formed by three segments joined together at vertical joins 16 running parallel to the axis of rotational symmetry of the tower. In alternative embodiments, each cylindrical section may be formed of more or fewer segments. Further, the number of segments from which each section is formed may differ depending on where in the tower the section will be located. As the diameter of the tower is largest at the bottom, the cylindrical sections for this part of the tower may be divided into more segments than sections from the top of the tower where the diameter is smaller.

The segments are joined to one another by bolting along the complementary vertical flanges arranged on their interior surfaces. The vertical flanges cannot be seen in FIG. 1 but are visible in FIG. 9. Joining the segments together into the cylindrical sections is preferably carried out before the step of assembling the cylindrical sections into the tower. The segments may be arranged horizontally while they are joined to one another.

As mentioned above, securing the segments together using vertical flanges to make sections, and securing the sections together using horizontal flanges in order to construct the tower, is known from published patent application number WO 2004/083633 A1, filed on 19 Mar. 2003, which is hereby incorporated by reference.

The segments may have substantially the same arc length and therefore subtend substantially the same angle with respect to the centre of the tower section. Alternatively, it may be preferable to cut the tower section into segments of unequal arc lengths.

The wind turbine towers described and illustrated herein are cylindrical in shape. They may also be tapered so that the diameter of the tower at the base is greater than the diameter of tower near the nacelle. Although a cylinder with a circular cross-section has been described, the cross-section may also be elliptical, polygonal, or generally polygonal, that is polygonal but with curved or rounded edges. For polygonal cross-sections, the segments of the vertical wind turbine sections can be formed so that once assembled the vertical edges of the segments are positioned mid-way or partially mid-way along the sides of the surface, rather than at the vertices of the cylinder. This will mean that the segments will have a curved, angled or bent surface profile between the two vertical edges.

The reassembly of the tower segments to form cylindrical tower sections will now be described.

Figure 2A:
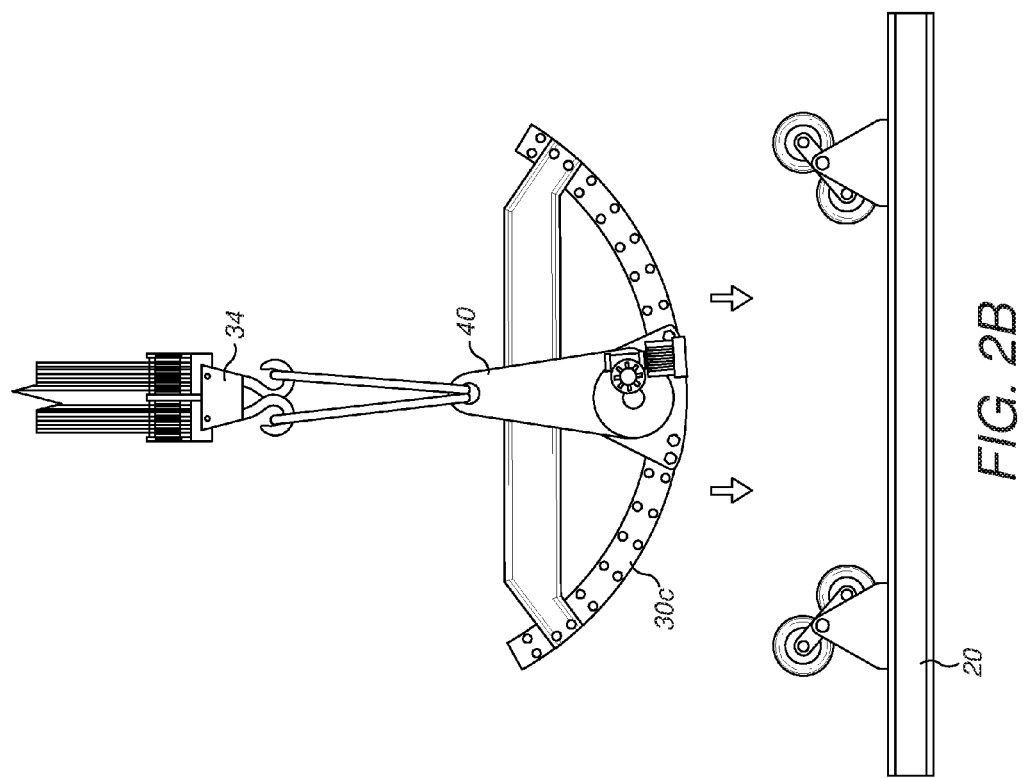
FIGS. 2A and 2B show the unloading of a first segment from a trailer onto a roller bed during a reassembly process.
Figure 2B:
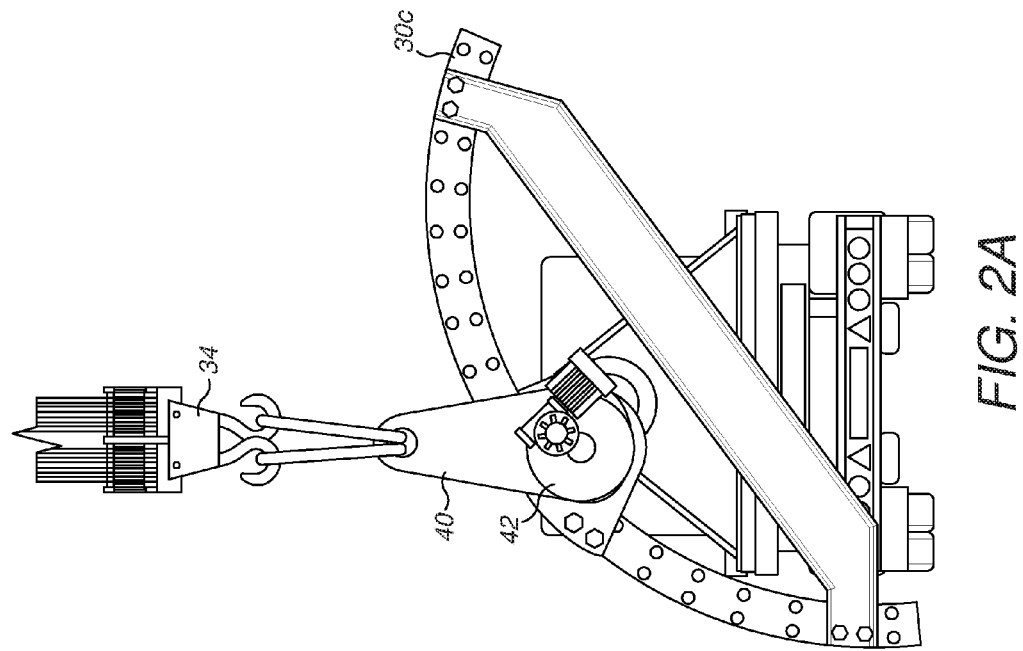

As shown in FIG. 2A, the tower segments are delivered to the site of the wind turbine construction on suitable transport means such as a trailer. Each tower segment is removed from the trailer and lowered onto a suitable support structure such as the roller bed 20 using a crane 34. Other suitable support structures for supporting the tower segments are available. FIGS. 2A and 2B show the unloading of a first tower segment 30c. A mounting bracket 40 is attached, for example by means of hooks and loops, to the crane 34. It is also bolted onto, or grips onto, the segment 30c. Mounting bracket 40 is equipped with rotation means 42 which rotates about its longitudinal axis, allowing the angle of the segment 30c to which the mounting bracket is attached to be changed relative to the crane 34. Rotation means 42 comprises, for example, an electric motor and gear system in order to rotate segment 30b in a controlled way at the same time as it is lowered by the crane 34.

Figure 4:
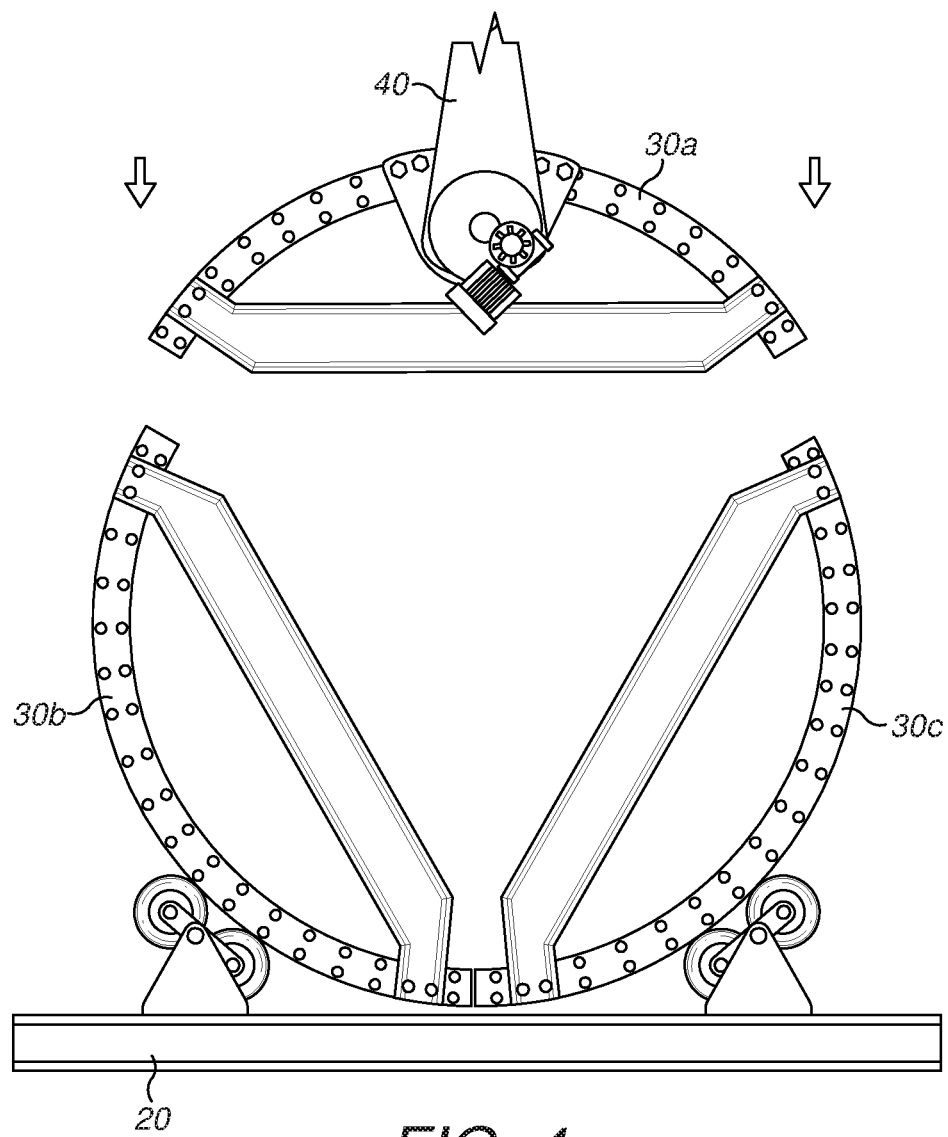
FIG. 4 shows the unloading of a third segment onto the roller.

FIG. 3A shows how reassembly of the tower section continues with the next segment, 30b, as shown being lifted by the crane 34 in the figure. The segment 30b arrives at the construction site in a similar manner to that of segment 30c and is lowered into contact with segment 30c. FIG. 3B shows the segment 30b being lowered to come into contact with segment 30c. The vertical flanges along the edges of the respective segments are then joined. The rotation means 42 then causes segment 30b to rotate in the direction shown by the arrow 130, clockwise in this case, so that both segments 30b and 30c rotate. The final segment 30a can then be lifted and lowered into position, filling the gap between the two segments as illustrated in FIG. 4.

Figure 5:
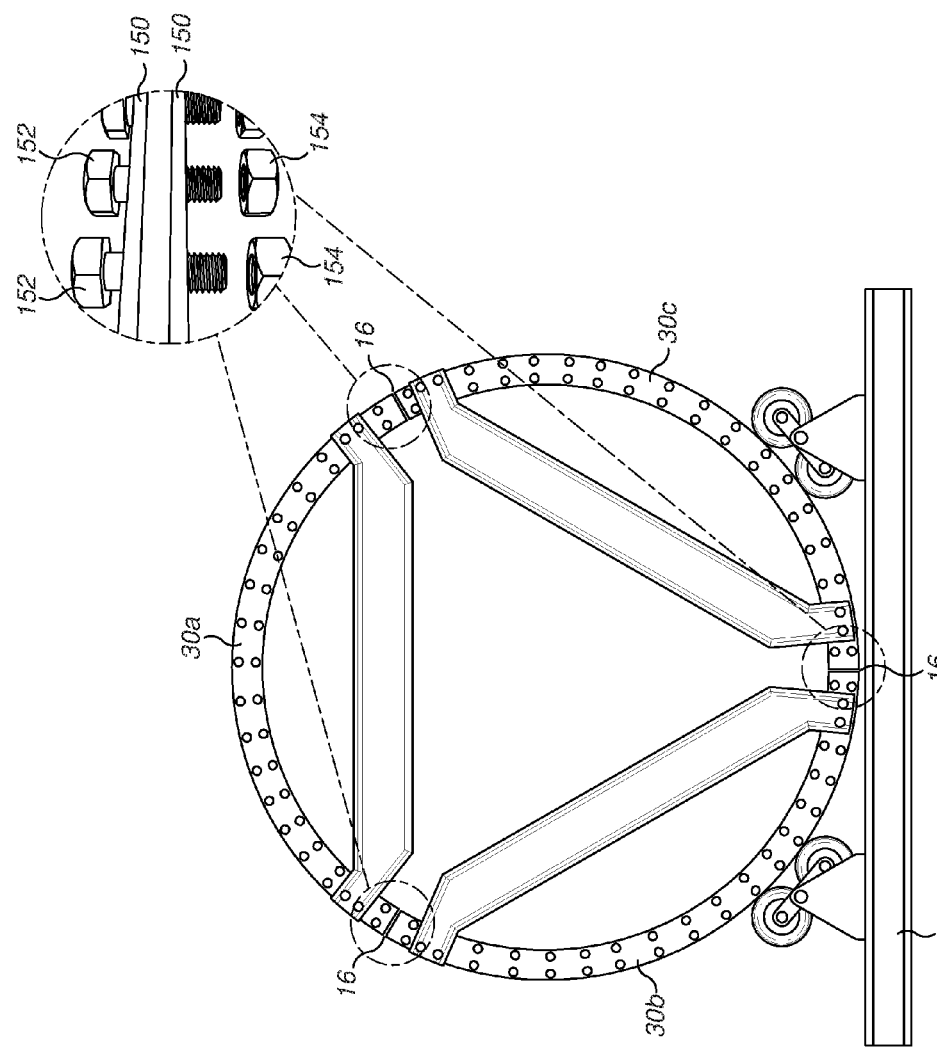
FIG. 5 shows a complete tower section formed of three connected tower segments, with the vertical flanges connected together.

FIG. 5 shows the reassembled tower section, with all of the segments 30a,b,c in place and the joins between adjacent segments, which are present along the lines 16 in the tower section, secured. This is made possible by longitudinal flanges 150 running the length of the lines 16, which are secured to each other with a row of bolts 152 and nuts 154 passing through regularly spaced holes in the flanges 150.

During the connection of the adjacent segments, the tower segments 30a,b,c are rotatably adjusted until the adjacent vertical flanges 150 are aligned with each other and at the desired separation. The vertical flanges 150 are then bolted together along their length using conventional bolting methods. The vertical flanges 150 may be retained in a horizontal position during the connection process.

During the process of connecting the vertical flanges 150 of the adjacent tower segments, an alignment system according to the invention (not shown in the previously described figures) is used to facilitate the alignment of the vertical flanges 150 of the adjacent tower segments 30a,b,c. The alignment system comprises a plurality of alignment tools 200 mounted along each of the vertical flanges 150 to be connected. The alignment tools 200 are mounted on each flange 150 such that each alignment tool 200 will be positioned opposite a corresponding alignment tool on the opposite vertical flange once the tower segments are brought together. As described above, the alignment tools 200 operate in pairs which engage with each other during the alignment process to align the pair of vertical flanges. For each tower segment, a plurality of alignment tools 200 may be spaced apart along the length of the vertical flange 150. It should be noted that the description of ways to handle the sections with reference to FIGS. 1-5 should not in any way be limiting with respect to the alignment tool, use of it and methods related hereto. A skilled person in the art would appreciate other handling steps to bring two vertical flanges towards each other whereby alignment tools as described herein would find use.

Figure 6:
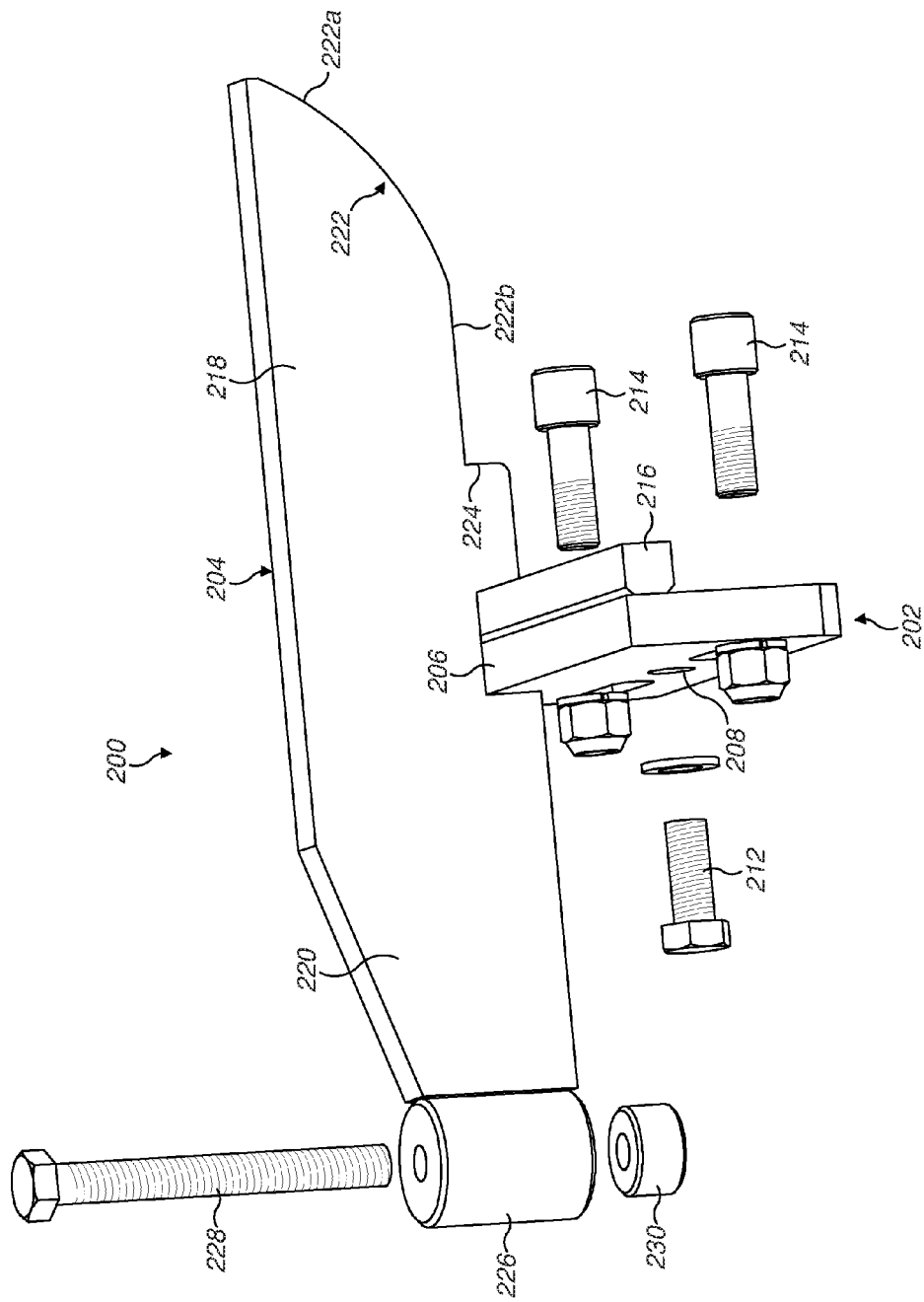
FIG. 6 is an exploded perspective view of an alignment tool according to an embodiment of the invention.

One of the alignment tools 200 of the alignment system is shown in FIGS. 6 to 8. The other alignment tools of the alignment system are of a corresponding construction. The alignment tool 200 comprises an attachment plate 202 and an alignment head 204 mounted on the top edge 206 of the attachment plate 202.

Figure 9:
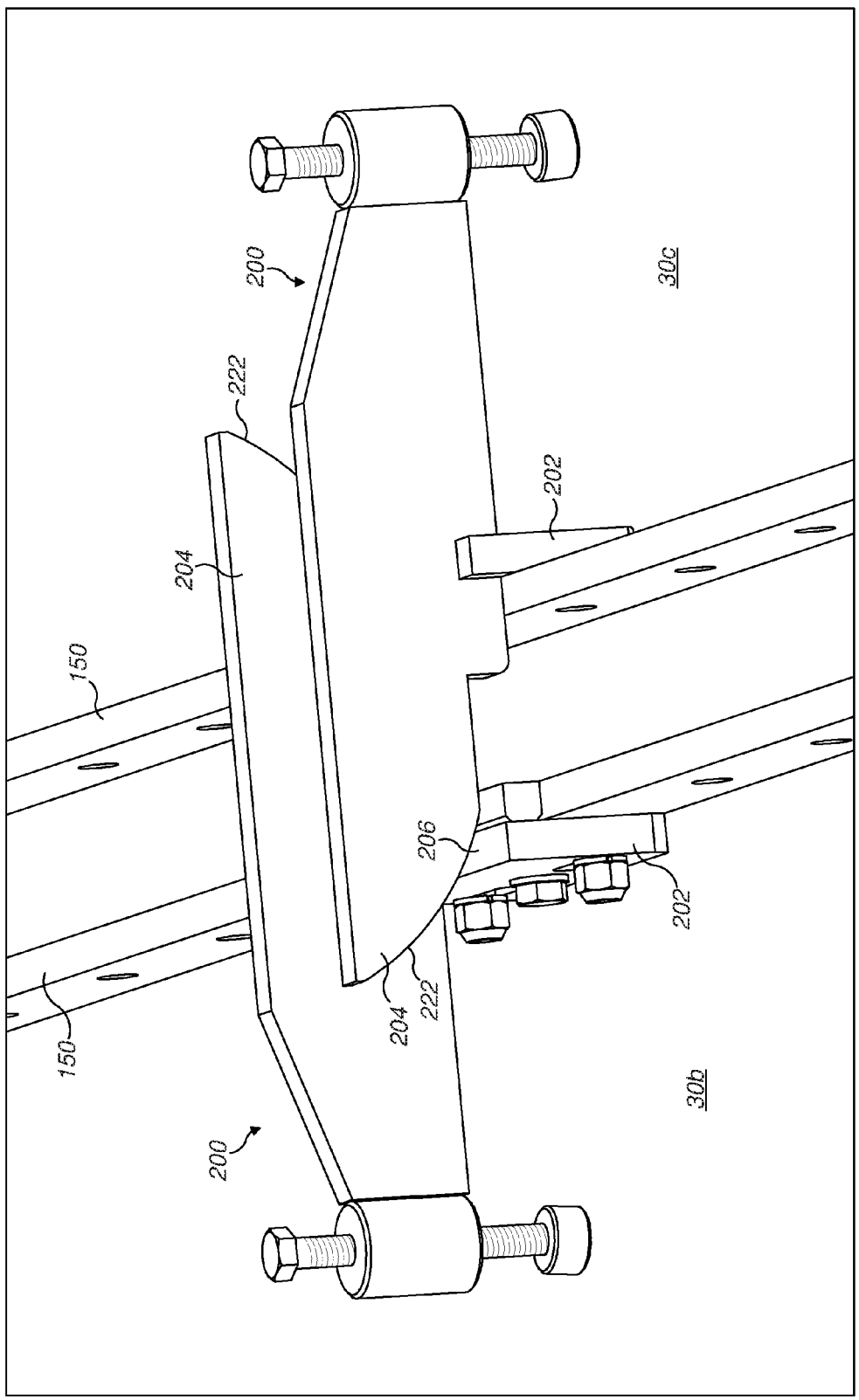
FIG. 9 shows the alignment system in place on the tower segments.

As shown in FIG. 8, the attachment plate 202 is a substantially rectangular plate having a straight top edge 206, a central bolt hole 208 and a pair of slotted holes 210 on either side of the central bolt hole 208. As illustrated in FIGS. 8 and 9, the attachment plate 202 is connected to a vertical flange by means of a central bolt fastener 212 passing through the central bolt hole 208 and a pair of support pin fasteners 214 passing through the slotted holes 210. Each of the fasteners 212, 214 passes through the respective hole in the attachment plate 202 and into a hole in the vertical flange 150. In this way, the attachment plate 202 is connected to the vertical flange to mount the alignment tool in the inside of the tower segment. Once mounted on the vertical flange, the top edge 206 of the attachment plate 202 lies a small distance above the top edge of the vertical flange 150 and provides the top guiding edge of the alignment tool.

An additional flange 216 is provided at the top of the attachment plate 202, with the top edge of the additional flange 216 substantially flush with the top edge 206 of the attachment plate 202. The lower edge of the additional flange 216 lies in contact with the top edge of the vertical flange 150.

The alignment head 204 comprises a single integral plate mounted at the top edge of the attachment plate 202, proximate one end of the attachment plate 202. The alignment head 204 is seated over the top edge 206 of the attachment plate 202 and the top edge of the additional flange 216 and is welded in place such that the alignment head 204 and the attachment plate 202 are fixed relative to each other.

The alignment head 204 comprises a front portion 218 extending in a forwards direction from the attachment plate 202 and a rear portion 220 extending in a backwards direction from the attachment plate 202. The front portion 218 and the rear portion 220 are integrally formed in a substantially straight line and form a continuous longitudinal piece which has a longitudinal axis that is substantially perpendicular to the longitudinal axis of the attachment plate 202. Once the alignment tool 200 is mounted on the vertical flange 150 of the tower segment, the front portion 218 extends towards and over the longitudinal edge whilst the rear portion 220 extends backwards into the main body of the tower segment.

The front portion 218 of the alignment head 204 has a lower guiding surface 222 which is adapted to slide over the top guiding edge 206 of the attachment plate 202 of the opposite alignment tool as the tower segments are brought together. The lower guiding surface 222 comprises a first convexly curved portion 222a which extends substantially from the top edge of the alignment head 204 at the distal end of the front portion 218 to a position approximately halfway along the front portion. The distal end of the front portion is therefore curved. The lower guiding surface 222 further comprises a flat, horizontal portion 222b extending continuously from the curved portion 222 towards the attachment plate 202. At a distance from the attachment plate 202, between the attachment plate 202 and the distal end of the front portion 218, an abutment 224 is provided in the lower guiding surface 222, which provides a substantially vertical abutment surface.

The rear portion 220 of the alignment head 204 comprises an annulus 226 at the distal end, furthest from the attachment plate 202, which provides a vertical channel to receive an adjustable screw member 228 which is used to engage the alignment tool 200 with the inner surface of the tower segment, as described above. The screw member 228 is provided with a resilient cap 230 for contact with the surface of the tower segment. During the process of mounting the alignment tool 200 on the vertical flange 150, the screw member 228 may be adjusted to bring the distal end into contact with the inner surface of the tower segment.

FIG. 9 shows a pair of tower segments 30b,c being reconnected, with the alignment system in place on the vertical flanges 150 of the segments. On each tower segment, a plurality of alignment tools 200 has been connected to the vertical flange 150 at spaced apart intervals along the flange and the tools have each been secured and braced against the inner surface of the tower segment by means of the respective screw members 228. The alignment tools 200 are mounted at corresponding positions on each of the pair of flanges so that when the adjacent tower segments 30b,c are brought together on the roller bed, the alignment tools 200 are brought together into co-operating pairs. One such pair is illustrated in FIG. 9.

For each pair of alignment tools 200, the alignment head 204 of each tool is brought into contact with the top guiding edge 206 of the attachment plate 202 of the opposite alignment tool 200, at the opposite end of the attachment plate 202 to the end at which the corresponding alignment head is mounted 204. As the tower segments 30b,c are rotated to bring the longitudinal edges towards each other, the alignment heads 204 will each slide over the opposite attachment plate 202 and the lower guiding surface 222 will guide the vertical flanges and align them at the same level as each other so that the holes in the flanges are lined up with each other. The alignment system retains the vertical flanges in alignment with each other whilst the bolts are passed through the holes in the vertical flanges to connect the flanges together. The alignment tools 200 may then be removed from the tower segments.

The example described above utilises an alignment system according to the invention comprising a pair of alignment tools. It will be appreciated that the described alignment method could be carried out using an alignment system according to the invention using a guiding bracket in place of the second alignment tool.

The invention claimed is:

1. A wind turbine tower segment for forming a cylindrical section of a wind turbine tower, the cylindrical section constructed from a plurality of tower segments connected along their respective longitudinal edges, wherein the tower segment comprises a first vertical flange on the interior thereof, proximate a longitudinal edge and further comprises an alignment tool mounted on the first vertical flange for the alignment of the first vertical flange of the tower segment with a second vertical flange of an adjacent tower segment during the connection of the adjacent tower segments to form the cylindrical section, the alignment tool comprising:
   mounting means connecting the alignment tool to a portion of the first vertical flange of the tower segment; and
   a longitudinal alignment head comprising a front portion extending in a forwards direction from the mounting means over the longitudinal edge of the tower segment, the front portion comprising a lower guiding surface adapted to abut with a top guiding edge of the second vertical flange of the adjacent tower segment and to guide the alignment head over the top guiding edge of the second vertical flange as the first and second vertical flanges are brought towards each other during connection of the adjacent tower segments, the lower guiding surface comprising an abutment between a distal end of the front portion of the alignment head and the mounting means for limiting the sliding movement in the forwards direction of the alignment head over the top guiding edge when the alignment head is on the top guiding edge.

2. A tower segment, alignment system or alignment tool according to claim 1 wherein the mounting means comprises an attachment bracket adapted to receive one or more fasteners for the connection of the attachment bracket against the corresponding vertical flange, wherein the alignment head is mounted on the attachment bracket.

3. A tower segment, alignment system or alignment tool according to claim 2 wherein the alignment head is mounted adjacent a first end of the top edge of the attachment bracket.

4. A tower segment, alignment system or alignment tool according to claim 2 wherein the alignment head is mounted substantially perpendicularly to the top edge of the attachment bracket.

5. A tower segment, alignment system or alignment tool according to claim 2 wherein the alignment head is fixedly mounted on the top edge of the attachment bracket.

6. A tower segment, alignment system or alignment tool according to claim 2 wherein the alignment head is pivotally mounted on the top edge of the attachment bracket to enable pivotal movement of the alignment head relative to the attachment bracket.

7. A tower segment, alignment system or alignment tool according to claim 1 wherein the lower guiding surface of the or each alignment head curves or slopes in a downwards direction moving along the front portion of the alignment head from the distal end thereof along at least a part of the length of the front portion.

8. A tower segment, alignment system or alignment tool according to claim 1 wherein the alignment head of the alignment tool further comprises a rear portion extending backwards from the mounting means and adapted to engage with the inner surface of the respective tower segment during use.

9. A tower segment, alignment system or alignment tool according to claim 8 wherein the rear portion of the alignment head is adapted to receive a screw member or hydraulic member having a distal end adapted to engage with the inner surface of the respective tower segment during use.

10. A tower segment, alignment system or alignment tool according to claim 8 wherein the or each alignment tool further comprises an adjustable screw member or hydraulic member mounted in the rear portion of the alignment head for adjusting the screw member or hydraulic member to bring the distal end thereof into contact with the inner surface of the tower segment during use.

11. An alignment system for aligning a pair of vertical flanges for the connection of the longitudinal edges of adjacent tower segments of a cylindrical section of a wind turbine tower, wherein a vertical flange is provided on the interior of each tower segment, proximate the respective longitudinal edge, the alignment system comprising a first alignment tool for mounting on a first vertical flange of a first tower segment and a second alignment tool for mounting on a second vertical flange of a second tower segment substantially opposite the first alignment tool, each of the first and second alignment tools comprising:
   mounting means for connecting the alignment tool to a portion of the vertical flange of the respective tower segment;
   a top guiding edge adapted to sit above the top edge of the corresponding vertical flange during use; and
   a longitudinal alignment head comprising a front portion extending in a forward direction from the mounting means towards the opposite alignment tool and comprising a lower guiding surface adapted to abut with the top guiding edge of the opposite alignment tool and to guide the alignment head over the top guiding edge of the opposite alignment tool as the alignment tools are brought towards each other during connection of the first and second tower segments.

12. An alignment system according to claim 11 wherein the mounting means of each alignment tool provides at least a part of the top guiding edge thereof.

13. An alignment system according to claim 11 further comprising means for clamping the first and second alignment tools together during use.

14. An alignment tool for use in aligning a pair of vertical flanges for the connection of the longitudinal edges of adjacent tower segments of a cylindrical section of a wind turbine tower, wherein a vertical flange is provided on the interior of each tower segment, proximate the respective longitudinal edge, the alignment tool comprising:

mounting means for connecting the alignment tool to a portion of the vertical flange of the tower segment; and a longitudinal alignment head for aligning the vertical flange with an opposing vertical flange of an adjacent tower segment, the alignment head comprising a front portion extending in a forwards direction from the mounting means, the front portion comprising a lower guiding surface adapted to abut with a top guiding edge of the opposing vertical flange or a bracket mounted thereon and to guide the alignment head over the top edge of the opposing flange or bracket as the vertical flanges are brought towards each other during connection of the adjacent tower segments, the lower guiding surface comprising an abutment between a distal end of the front portion of the alignment head and the mounting means for limiting the sliding movement of the alignment head over the top guiding edge.

15. A method for the alignment of the vertical flanges of adjacent tower segments of a cylindrical section of a wind turbine tower during the connection of the longitudinal edges of the adjacent segments, each segment comprising a vertical flange on the interior of the segment, proximate the respective longitudinal edge, the method comprising the steps of:

installing an alignment system according to claim 11 into the adjacent tower segments by mounting a first alignment tool on the vertical flange of the first tower segment and mounting a second alignment tool on the vertical flange of the second tower segment;

arranging the tower segments with the respective longitudinal edges adjacent to each other; and adjusting the tower segments to bring the longitudinal edges towards each other such that the alignment head of each alignment tool is guided over the top guiding edge of the opposite flange or the alignment tool mounted thereon until the vertical flanges are a predetermined distance from each other.

16. A method according to claim 15 wherein the first and second alignment tools are mounted at a corresponding longitudinal position to each other with the respective alignment heads offset from each other in the longitudinal direction such that the lower guiding surface of the alignment head of each alignment tool abuts the top guiding edge of the opposite alignment tool to align the levels of the vertical flanges.

17. A method for the alignment of the vertical flanges of adjacent tower segments of a cylindrical section of a wind turbine tower during the connection of the longitudinal edges of the adjacent segments, each segment comprising a vertical flange on the interior of the segment, proximate the respective longitudinal edge, the method comprising the steps of:

installing an alignment tool according to claim 14 on the vertical flange of the first tower segment;

arranging the tower segments with the respective longitudinal edges adjacent to each other such that the alignment head of the alignment tool is abutting the top edge of the opposite vertical flange of the adjacent tower segment to align the levels of the vertical flanges; and adjusting the tower segments to bring the longitudinal edges towards each other such that the alignment head of the alignment tool is guided over the top edge of the opposite vertical flange until the vertical flanges are a predetermined distance from each other.

\* \* \* \* \*